Figure 1:
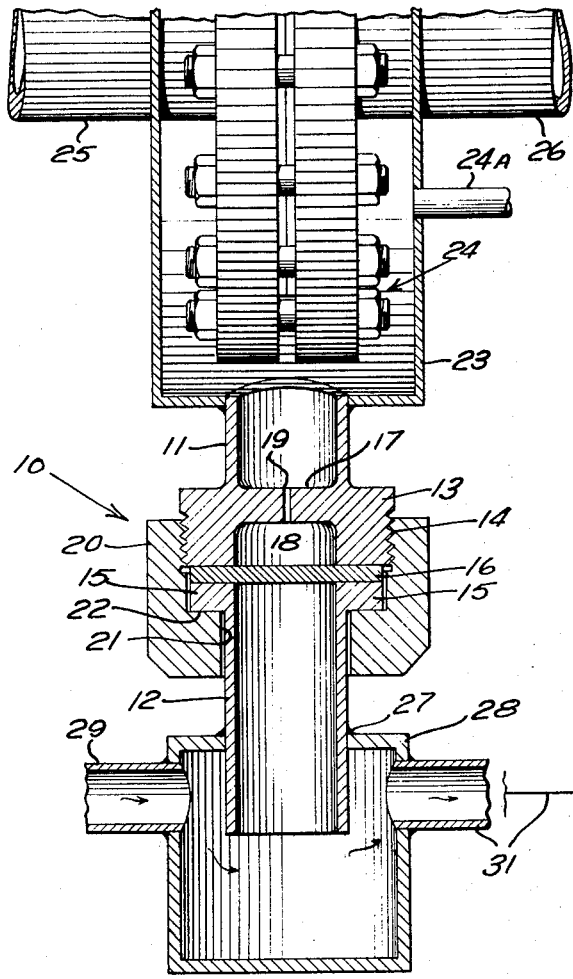

May 24, 1960      A. BELL      2,937,520

LIQUID LEAK TRANSMITTING DEVICE

Filed Feb. 3, 1956

INVENTOR
ALAN BELL
BY
ATTORNEY

United States Patent Office 2,937,520
Patented May 24, 1960

2,937,520
LIQUID LEAK TRANSMITTING DEVICE

Alan Bell, Sutton Courtenay, England, assignor to Foster Wheeler Corporation, New York, N.Y., a corporation of New York Filed Feb. 3, 1956, Ser. No. 563,357

12 Claims. (Cl. 73—40.5)

This invention relates to leakage detection devices and more particularly to liquid leak transmitting devices for interconnecting a fluid sealing closure and a leak detecting and indicating instrument.

In apparatus wherein the escape or leakage of a liquid therefrom is particularly undesirable or dangerous, couplings, flanged joints, valve glands, pump glands, and the like, of the apparatus are provided with sealing closures which are adapted to receive a fluid under a pressure substantially the same as the pressure of the liquid within the portion of the apparatus adjacent the sealing closure. Since the pressure in a sealing closure surrounding a joint or coupling is substantially equal to the liquid in the apparatus at the joint or gland, leakage of liquid through the joint or gland is obviated.

There nevertheless exists, in the aforesaid structures, the possibility of liquid leakage which must be quickly detected, particularly when the liquid, as for example molten sodium, is of a dangerous nature.

The present invention contemplates a liquid leak transmitting device for interconnecting a sealing closure, surrounding a joint or gland of a liquid containing apparatus, and a leak detecting and indicating instrument whereby quick detection of liquid leakage and the prevention of an appreciable loss of gas from the sealing closure is effectuated. The liquid leak transmitting device comprises a housing which is divided into two chambers by a diaphragm or plate susceptible to rapid corrosion and perforation upon contact with liquid leaking from a joint or gland, one chamber being in communication with the sealing closure and the other chamber communicating with the leak detecting and indicating instrument. In the event of leakage of liquid from the gland or joint, the liquid passes from the sealing closure into the chamber, communicating with the sealing closure and into contact with the diaphragm separating the two chambers. Upon failure or perforation of the wall, the liquid passes to the chamber communicating with the leak detecting and indicating instrument. The chamber in communication with the sealing closure is provided with means for passing liquid leakage therethrough, while simultaneously restricting the flow of gas from the sealing closure through the chambers upon failure of the diaphragm separating the chambers.

Figure 2:
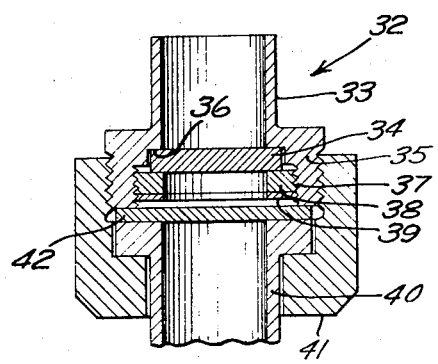

The invention will be more fully understood from the following detailed description thereof when considered with the accompanying drawing wherein two embodiments of the invention are illustrated by way of example and in which:

Fig. 1 is a view, in cross-section, of a liquid leak transmitting device constituting a first embodiment of the present invention; and Fig. 2 is a fragmentary view, in cross-section, of a pressurized liquid transmitting device constituting a second embodiment of the present invention.

Referring to the drawings, and more particularly to Fig. 1, 10 designates a liquid leak transmitting device, according to a first embodiment of this invention, which comprises two hollow cylinders 11 and 12, disposed in vertical axial alignment and open at both ends. Upper cylinder 11 has an enlarged end portion 13 which is externally threaded at 14, while lower cylinder 12 is provided with a flanged end 15, adjacent end portion 13 of cylinder 11. Interposed between end portion 13 of cylinder 11 and flange 15 of cylinder 12 is a diaphragm or plate 16 which is constructed of material susceptible to rapid corrosion by liquid which contacts plate 16, as hereinafter more fully described. Cylinder 11 is provided with an internal transverse wall 17 to form a chamber 18 between the wall and plate 16. Wall 17 is provided with an orifice 19, the purpose of which will be hereinafter described. Cylinders 11 and 12 are secured together by a union nut 20, which has a central opening 21 to receive therethrough cylinder 12. Union nut 20 is threadably receivable on threaded end portion 13 of cylinder 11 and has an internal shoulder 22 which engages flange 15 of cylinder 12 so that, as union nut 20 is threaded upon threads 14 of end portion 13, the shoulder 22 abuts against flange 15 to draw cylinder 12 toward cylinder 11 and secure plate 16 between the cylinders in a fluid tight manner.

Cylinder 11 is secured at the end opposite end portion 13 thereof, to the bottom of a sealing closure 23 (partly shown), in a suitable manner, as for example by welding or soldering. Sealing closure 23 surrounds a flanged pipe connection 24 (partly shown) which joints two liquid conducting pipes 25 and 26. Closure 23 is provided with a conduit 24A which is connected to a source of gas at a pressure substantially equal to the pressure of the liquid in pipes 25 and 26. For example, conduit 24A may be connected to the gas space of a header tank in which the liquid flowing through pipes 25 and 26 is maintained under a relatively high pressure to thereby receive a portion of the gas supplied to the header tank.

Cylinder 12 is connected as by welding shown at 27, to a cylindrical receptacle 28 which is connected through a conduit 29 to a suitable source of fluid, as for example air. Housing 28 also communicates with a leak detecting and indicating instrument 30, schematically shown in Fig. 1, through a conduit 31.

In use of the aforedescribed liquid leak transmitting device 10, chamber 18 receives gas, which is supplied to sealing closure 23 at a pressure substantially equal to the pressure of the liquid in pipes 25 and 26, through cylinder 11 and orifice 19 in wall 17. Plate 16 seals off the gas from cylinder 12 to thereby contain the gas within sealing closure 23. In the event of liquid leaking from the flanged pipe connection 24, the liquid falls to the bottom of sealing closure 23, whence it flows into cylinder 11. The liquid then passes through orifice 19 into chamber 18 where it contacts plate 16. Plate 16 is constructed of any suitable material, as for example wire woven compressed asbestos fibre, such as klingerit 1,000, which is susceptible to rapid corrosion by a corrosive liquid, as for example molten sodium. Upon failure or perforation of plate 16, due to the corrosive action thereon by the liquid, the latter passes through cylinder 12 and into receptacle 28. The liquid entering receptacle 28, depending upon the nature of the fluid employed, is either carried by the fluid flowing into and through receptacle 28, by way of conduits 29 and 31, to leak detecting and indicating instrument 30, or reacts with the fluid passing through receptacle 28 whereby the resultant products of the reaction are carried through conduit 31 to leak detecting and indicating instrument 30. For example, if pipes 25 and 26 carry liquid sodium, receptacle 28 may be supplied through conduit 29 with air which upon contact with liquid sodium, reacts therewith to produce a vapor of sodium oxide, the sodium oxide being carried to the leak detecting and indicating instrument 30 through conduit 31.

When liquid leakage occurs and plate 16 is perforated to release liquid into cylinder 12, the pressure within sealing closure 23 is prevented from rapidly falling below the desired pressure (pressure corresponding substantially to that of the pressure pipes 25 and 26) by orifice 19 which, while allowing the liquid to flow therethrough, restricts the passage of gas. Since the rate of pressure loss within the sealing closure is maintained relatively low, the loss of gas and pressure is held to a minimum while the apparatus is being shut-down for repair of the joint, as for example the flanged pipe connection 24. In addition, orifice 19 prevents the rapid loss of gas while plate 16 is being replaced, as where replacement is necessary as a consequence of premature failure of plate 16.

In Fig. 2 is shown a coupling device 32, constituting another embodiment of this invention, which differs from the embodiment illustrated in Fig. 1, in that an upper cylinder 33, similar to cylinder 11 of coupling device 10, is provided with a porous disc 34 in place of wall 17.

Upper cylinder 33 of coupling device 32 is provided with an enlarged end portion 35, which is externally threaded. The enlarged end portion 35 is also provided with an internal annular shoulder 36 which seats porous disc 34. Lower end portion 35 is internally threaded at 37 to receive an externally threaded retaining ring 38, which ring when threaded into end portion 35 clamps porous disc 34 against annular shoulder 36. A locking ring 39 is threaded against retaining ring 38 to lock the latter in position against porous disc 34.

Cylinder 33 is connected to a lower cylinder 40, similar in construction to cylinder 12 of coupling device 10, by a union nut 41 in the same manner as the pressurized liquid transmitting device 10 of Fig. 1. Interposed between the adjacent ends of cylinders 33 and 40, is a plate 42, similar to plate 16 of coupling device 10 (Fig. 1). Cylinder 33 is connected to a sealing closure (not shown) and cylinder 40 is connected to a receptacle (not shown), such as receptacle 28 (Fig. 1) in the same manner as coupling device 10 shown in Fig. 1.

In operation, liquid leaking from a joint, such as the flanged pipe connection 24 (Fig. 1), and into a sealing closure surrounding the joint, passes into cylinder 33. The liquid passes through porous disc 34, which disc may be constructed of sintered steel having a porosity which allows the liquid to pass therethrough but retards the flow of gas therethrough. After passing through porous disc 34, the liquid enters the space between porous disc 34 and plate 16, and in contact with plate 42. The liquid, after a short residence time in contact with plate 42, perforates plate 42 by reason of the corrosive action of the liquid thereon. Plate 42, or plate 16, may be constructed of wire woven compressed asbestos fiber, such as klingerit 1000 or any other material readily perforated by liquid sodium. After perforating plate 42, the liquid then falls through cylinder 40 into a receptacle (not shown), similar to receptacle 28 shown in Fig. 1. The liquid in the receptacle, as described with reference to Fig. 1, is either carried to a leak detecting and indicating instrument by a fluid passing through the receptacle, or the liquid reacts with the fluid in the receptacle and the reaction products are carried to the leak detecting or indicating instrument.

The function of porous disc 34 is the same as orifice 19 in wall 17 of cylinder 11; namely, it permits the passage of liquid while restricting the passage of gas therethrough upon perforation of plate 42.

As can be readily seen from the foregoing description, novel liquid leak transmitting devices are provided for interconnecting a sealing closure with a leak detecting and indicating device, which liquid leak transmitting devices, quickly transmit leaking liquid to the leak detecting and indicating instruments while maintaining minimum pressure loss in the gas sealing closure during the time between the occurrence of a leak in the liquid containing apparatus and its shut-down for repairs.

Although two embodiments of the invention has been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. A device of the class described adapted for communicating a gas filled sealing closure substantially enclosing that portion of a liquid containing apparatus having a tendency toward liquid leakage with a liquid leakage detecting and indicating instrument, said device comprising a first shell member being open at both ends and communicating at one end with the sealing closure, a second shell member being open at both ends and communicating at one end with said instrument, said second shell member being arranged with the free end thereof adjacent the free end of said first shell member, a diaphragm disposed between the adjacent ends of said first and second shell members to maintain the instrument out of communication with said closure when liquid leakage is non-existent and to prevent flow of gas from said closure, said diaphragm being susceptible to rapid perforation upon contact with liquid leakage to communicate the closure with the instrument upon the occurrence of liquid leakage to provide for flow of the liquid to the instrument, and means in said first shell member for restricting escape of the gas from said closure to said second shell member when the closure is brought into communication with said instrument by perforation of said diaphragm.

2. The device of claim 1 wherein said means comprises a wall having an orifice therein for passing liquid leakage and for restricting the escape of the gas from said closure upon perforation of said diaphragm.

3. A device of the class described adapted for communicating a gas filled sealing closure substantially enclosing that portion of a liquid containing apparatus having a tendency toward liquid leakage with a liquid leakage detecting and indicating instrument, said device comprising a first cylindrical shell member being open at both ends and communicating at one end with said sealing closure, a second cylindrical shell member being open at both ends and communicating at one end with said instrument, said second shell member being disposed with the free end thereof adjacent the free end of said first shell member, a diaphragm disposed between the adjacent ends of said first and second shell members to maintain the instrument out of communication with said closure when liquid leakage is non-existent and to prevent flow of gas from said closure, means for securing said first and second shell members together and for clamping said diaphragm between said first and second shell members in a fluid tight manner, said diaphragm being susceptible to rapid perforation upon contact with liquid leakage to communicate the closure with the instrument upon the occurrence of liquid leakage to provide for flow of the liquid to the instrument, and second means in said first shell member for restricting escape of the gas from said closure to said second shell member when the closure is brought into communication with said instrument by perforation of said diaphragm.

4. A device of the class described adapted for communicating a gas filled sealing closure substantially enclosing that portion of a liquid containing apparatus having a tendency toward liquid leakage with a liquid leakage detecting and indicating instrument, said device comprising a first hollow cylindrical member disposed vertically and being open at both ends and in communication at the upper end with the bottom of said sealing closure, a second hollow cylindrical member being open at both ends and disposed vertically below and in axial alignment with said first cylindrical member, said second cylindrical member being in communication at the lower end with said instrument, a plate member disposed between the adjacent ends of said first and second cylindrical members to maintain the instrument out of communication with said closure when liquid leakage is non-existent and to prevent flow of gas from said closure, said plate being susceptible to rapid perforation upon contact with liquid leakage to communicate the closure with the instrument upon the occurrence of liquid leakage to provide for flow of the liquid to the instrument, means for securing said first and second cylindrical members together and for clamping said plate member between said first and second cylindrical members in a fluid tight manner, and a transverse wall disposed in said first cylindrical member, said wall having an orifice therein for passing liquid leakage and for restricting escape of the gas from said closure to said second cylindrical member when the closure is brought into communication with said instrument by perforation of said plate member.

5. A device of the class described adapted for communicating a gas filled sealing closure substantially enclosing that portion of a liquid containing apparatus having a tendency toward liquid leakage with a liquid leakage detecting and indicating instrument, said device comprising a first shell member being open at both ends and communicating at one end with said instrument, a second shell member being open at both ends and communicating at one end with said instrument, said second shell member being disposed with the free end thereof adjacent the free end of said first shell member, a diaphragm disposed between the adjacent ends of said first and second shell members to maintain the instrument out of communication with said closure when liquid leakage is non-existent and to prevent flow of gas from said closure, said diaphragm being susceptible to rapid perforation upon contact with liquid leakage to communicate the closure with the instrument upon the occurrence of liquid leakage to thereby provide for flow of the liquid to the instrument, and a porous wall in said first shell member for restricting escape of the gas from said closure to said second shell member when the closure is brought into communication with said instrument by perforation of said diaphragm.

6. The device of claim 5 wherein the porous wall is constructed of porous sintered steel.

7. A device of the class described adapted for communicating a gas filled sealing closure substantially enclosing that portion of a liquid containing apparatus having a tendency toward liquid leakage with a liquid leakage detecting and indicating instrument, said device comprising a first cylindrical shell member being open at both ends and communicating at one end with said sealing closure, a second cylindrical shell member being open at both ends and communicating at one end with said instrument, said shell member arranged with the free end thereof adjacent the free end of said first shell member, a diaphragm disposed between the adjacent ends of said first and second shell members to maintain the instrument out of communication with said closure when liquid leakage is non-existent and to prevent flow of gas from said closure, means for securing said first and second shell members together and for clamping said diaphragm between said first and second shell members in a fluid tight manner, said diaphragm being susceptible to rapid perforation upon contact with liquid leakage to communicate the closure with the instrument upon the occurrence of liquid leakage to provide for flow of the liquid to the instrument, a porous disc, said first cylindrical shell member having an internal seat to receive said porous disc, a retaining ring adapted to engage said first shell member to secure said porous disc within said seat, said porous disc having a porosity for restricting escape of gas from said closure to said second shell member when the closure is brought into communication with said instrument by perforation of said diaphragm.

8. The device of claim 7 wherein the means for securing said first and second shell members together is a union nut adapted to receive and engage said second shell member and wherein said first shell member is externally threaded to receive said union nut.

9. A device of the class described adapted for communicating a gas filled sealing closure substantially enclosing that portion of a liquid containing apparatus having a tendency toward liquid leakage with a liquid leakage detecting and indicating instrument, said device comprising a first cylindrical shell member being open at both ends and communicating at one end with said sealing closure, a second cylindrical shell member being open at both ends and communicating at one end with said instrument, said second shell member being disposed with the free end thereof adjacent the free end of said first shell member, a diaphragm disposed between the adjacent ends of said first and second shell members to maintain the instrument out of communication with said closure when liquid leakage is non-existent and to prevent flow of gas from said closure, means for securing said first and second shell members together and for clamping said diaphragm between said first and second shell members in a fluid tight manner, a liquid leakage receptacle disposed in communication with said second cylindrical shell member and said instrument for receiving liquid leakage from said second shell member, said receptacle being connected to a source of gas to receive said gas for entraining liquid leakage and carrying said liquid leakage to said instrument, said diaphragm being susceptible to rapid perforation upon contact with liquid leakage to communicate the closure with the leakage receptacle upon the occurrence of liquid leakage, and second means in said first shell member for restricting escape of the gas from said closure to said second shell member when the closure is brought into communication with said instrument by perforation of said diaphragm.

10. A device of the class described adapted for communicating a gas filled sealing closure substantially enclosing that portion of a liquid containing apparatus having a tendency toward liquid leakage with a liquid leakage detecting and indicating instrument, said device comprising a first chamber in communication with said closure, a second chamber disposed adjacent said first chamber, a leakage receptacle in communication with said second chamber and said instrument, means disposed between said first chamber and said second chamber to maintain the leakage receptacle out of communication with said closure when liquid leakage is non-existent to prevent flow of gas from said closure and for communicating the closure with the leakage receptacle upon the occurrence of liquid leakage, said leakage receptacle being in communication with a source of fluid to entrain said leakage liquid and conduct said liquid leakage to said instrument, and means in said first chamber for restricting escape of the gas from said closure to said second chamber when the closure is brought into communication with said instrument.

11. A device of the class described adapted for communicating a gas filled sealing closure substantially enclosing that portion of a liquid containing apparatus having a tendency toward liquid leakage with a liquid leakage detecting and indicating instrument, said device comprising means for maintaining the instrument out of communication with said closure when liquid leakage is non-existent to prevent flow of gas from said closure and automatically communicating the closure with the instrument in response to liquid leakage to provide for flow of the liquid to the instrument, and a second means for providing flow of liquid leakage to said instrument and restricting flow of the gas from the closure upon flow of liquid to said instrument.

12. A device of the class described adapted for communicating a gas filled sealing closure substantially enclosing that portion of a liquid containing apparatus having a tendency toward liquid leakage with a liquid leakage detecting and indicating instrument, said device comprising a first chamber in communication with said closure, a second chamber in communication with said instrument, means disposed between said one chamber and said second chamber to maintain the instrument out of communication with said closure when liquid leakage is non-existent to prevent flow of gas from said closure and automatically communicating the closure with the instrument in response to liquid leakage to provide for flow of the liquid to the instrument, and second means in said first chamber for providing flow of liquid leakage through said first and second chambers to said instrument and restricting escape of the gas from said closure through said first and second chambers when the closure is brought into communication with said instrument.

References Cited in the file of this patent

UNITED STATES PATENTS

| | | |
|---|---|---|
| 2,506,293 | Copeland | May 2, 1950 |
| 2,638,167 | Jones | May 12, 1953 |
| 2,691,773 | Lichtenberger | Oct. 12, 1954 |
| 2,766,614 | Cook | Oct. 16, 1956 |
| 2,819,609 | Liebhafsky | Jan. 14, 1958 |